United States Patent
Sprinzl et al.

(10) Patent No.: US 12,377,914 B2
(45) Date of Patent: Aug. 5, 2025

(54) APPARATUS AND METHOD FOR INFLUENCING AND/OR OPERATING A STEERING SYSTEM, AND STEERING SYSTEM, IN PARTICULAR FOR A VEHICLE

(71) Applicant: Robert Bosch GmbH, Stuttgart (DE)

(72) Inventors: Michael Sprinzl, Suessen (DE); Stefan Kanngiesser, Schwaebisch Gmuend (DE); Tobias Neulen, Baesweiler (DE); David Antonio Arriola Gutierrez, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 168 days.

(21) Appl. No.: 18/549,386

(22) PCT Filed: Dec. 14, 2021

(86) PCT No.: PCT/EP2021/085592
§ 371 (c)(1),
(2) Date: Sep. 7, 2023

(87) PCT Pub. No.: WO2022/189022
PCT Pub. Date: Sep. 15, 2022

(65) Prior Publication Data
US 2024/0174291 A1 May 30, 2024

(30) Foreign Application Priority Data
Mar. 9, 2021 (DE) ...................... 10 2021 202 278.2

(51) Int. Cl.
*B62D 15/02* (2006.01)
(52) U.S. Cl.
CPC .................................. *B62D 15/025* (2013.01)
(58) Field of Classification Search
CPC ....... B62D 15/025; B62D 5/091; B62D 6/008
See application file for complete search history.

(56) References Cited

U.S. PATENT DOCUMENTS

2019/0227563 A1* 7/2019 Shimakage .......... B62D 15/025
2020/0198693 A1* 6/2020 Milbaier ............ B62D 15/0215
(Continued)

FOREIGN PATENT DOCUMENTS

DE        100 52 559 A1    4/2002
DE    11 2019 000 362 T5   10/2020
(Continued)

OTHER PUBLICATIONS

International Search Report corresponding to PCT Application No. PCT/EP2021/085592, mailed Apr. 13, 2022 (German and English language document) (5 pages).

*Primary Examiner* — George C Jin
(74) *Attorney, Agent, or Firm* — Maginot, Moore & Beck LLP (57) ABSTRACT

A method is for influencing and/or operating a steering system, in particular a steer-by-wire steering system. In the method, a setpoint for an operating element actuator is determined independently of a setpoint for a steering gear actuator, and the operating element actuator is actuated depending on the setpoint for the operating element actuator. The setpoint for the steering gear actuator of the steering system is determined independently of the setpoint for the operating element actuator, and the steering gear actuator is actuated depending on the setpoint for the steering gear actuator. The setpoint for the operating element actuator is determined depending on a target value for a behavior of an operating element and depending on a first request value. The setpoint for the steering gear actuator is determined depending on a target value for a behavior of the steering gear actuator and depending on a second request value.

13 Claims, 5 Drawing Sheets

(56) References Cited

U.S. PATENT DOCUMENTS

| | | | |
|---|---|---|---|
| 2021/0179167 A1* | 6/2021 | Boos | B62D 6/10 |
| 2022/0089161 A1* | 3/2022 | Takebayashi | B60W 30/18145 |
| 2022/0089219 A1* | 3/2022 | Takebayashi | B62D 15/025 |
| 2023/0286575 A1* | 9/2023 | Handa | B62D 6/00 |
| 2024/0059350 A1* | 2/2024 | Sun | G05B 6/02 |
| 2024/0174291 A1* | 5/2024 | Sprinzl | B62D 6/008 |

FOREIGN PATENT DOCUMENTS

| | | |
|---|---|---|
| WO | 2014/115234 A1 | 7/2014 |
| WO | 2016/162902 A1 | 10/2016 |
| WO | 2019/116453 A1 | 6/2019 |

\* cited by examiner

APPARATUS AND METHOD FOR INFLUENCING AND/OR OPERATING A STEERING SYSTEM, AND STEERING SYSTEM, IN PARTICULAR FOR A VEHICLE

This application is a 35 U.S.C. § 371 National Stage Application of PCT/EP2021/085592, filed on Dec. 14, 2021, which claims the benefit of priority to Serial No. DE 10 2021 202 278.2, filed on Mar. 9, 2021 in Germany, the disclosures of which are incorporated herein by reference in their entirety.

BACKGROUND

The disclosure relates to an apparatus and a method for influencing and/or operating a steering system, and to a steering system, in particular for a vehicle.

WO 2014/115234 A1 and WO 2019/116453 A1 disclose aspects of steering systems for vehicles. WO 2016/162902 discloses aspects of a lane assistance system for vehicles.

In such systems, functions are used that either situationally adjust the steering turns on wheels of vehicles following a driver specification set by an operating element, or provide different steering turns to the driver with or without feedback from the steering wheel.

SUMMARY

The subject matter of the independent claims improves an interaction between the driver and a function that can situationally implement or change a specification by the driver.

A method for influencing and/or operating a steering system, in particular a steer-by-wire steering system for a vehicle, provides that a setpoint for an operating element actuator of the steering system is determined independently of a setpoint for a steering gear actuator, and the operating element actuator is actuated depending on the setpoint for the operating element actuator; the setpoint for the steering gear actuator of the steering system is determined independently of the setpoint for the operating element actuator, and the steering gear actuator is actuated depending on the setpoint for the steering gear actuator, wherein the setpoint for the operating element actuator is determined depending on a target value for a behavior of an operating element and depending on a first request value, and the setpoint for the steering gear actuator is determined depending on a target value for a behavior of the steering gear actuator and depending on a second request value, and wherein the first request value is determined depending on a target value of a function for influencing the operating element actuator, and the second request value is determined depending on a target value of a function for influencing a behavior of the steering gear actuator of the vehicle. As a result, in a steer-by-wire system, the operating element actuator, for example a steering wheel actuator or a force feedback joystick, can be actuated fully independently of the steering gear actuator.

It can be provided that the target values are influenced and/or specified by the request values independently of one another. As a result, the operating element actuator and the steering gear actuator are influenced by the request values or merely specified by the request values independently of one another.

The following aspects help to achieve a behavior that is characteristic for a vehicle manufacturer in the transition from the function to control by the driver.

In one aspect, it is provided that a deviation between the target value for the behavior of the steering gear actuator and the target value of the function for influencing the behavior of the steering gear actuator is determined, wherein the first request value and/or second request value is determined depending on the deviation. The behavior of the steering gear actuator is thereby set differently, depending on the deviation.

It is preferably provided that the first request value is determined depending on a sum of the target value of the function for influencing the operating element actuator with a first component that is independent from the deviation and/or depending on a product of the sum or the target value for the operating element actuator with a second component that changes depending on the deviation. Doing so enables the design of a transition between the driver and the function.

Preferably, the second component is a function of the deviation. Doing so enables a fading in or a fading out of the driver's influence or the function on the operating element actuator.

Preferably, it is provided that the second request value is determined depending on a product of the second target value for the steering gear actuator with a third component that changes depending on the deviation and/or depending on a difference between this product and the target value for the steering gear actuator. Doing so enables the design of a transition between the driver and the function.

Preferably, the third component is a function of the deviation. Doing so enables a fading in or out of the driver's influence on the steering gear actuator.

Preferably, the second request value is determined depending on a product of the difference with a fourth component that changes depending on the deviation. Doing so enables the improvement of a transition between the driver and the function.

Preferably, the fourth component decreases with an increasing deviation. Doing so enables a fading in or a fading out of the influence of the function on the steering gear actuator.

In one aspect, an input, in particular of a user, is captured, wherein, depending on the input, in a first operating mode, the operating element actuator is actuated depending on the first request value and the steering gear actuator independently of the second request value or, in a second operating mode, the operating element actuator is actuated at least temporarily depending on the first request value and the steering gear actuator is actuated at least temporarily depending on the second request value, or, in a third operating mode, the operating element actuator is actuated with a constant first request value and the steering gear actuator at least temporarily depending on the second request value. As a result, the behavior of the function and thus the influence of the driver on the lateral guidance of the vehicle is situationally adjustable.

An apparatus for influencing and/or operating a steering system, in particular a steer-by-wire steering system for a vehicle, comprises a computing device which is designed to perform the method. A steering system, in particular a steer-by-wire steering system for a vehicle, can comprise this apparatus.

BRIEF DESCRIPTION OF THE DRAWINGS

Further advantageous embodiments follow from the description and the drawings hereinafter. The drawings show.

DETAILED DESCRIPTION

Figure 1:
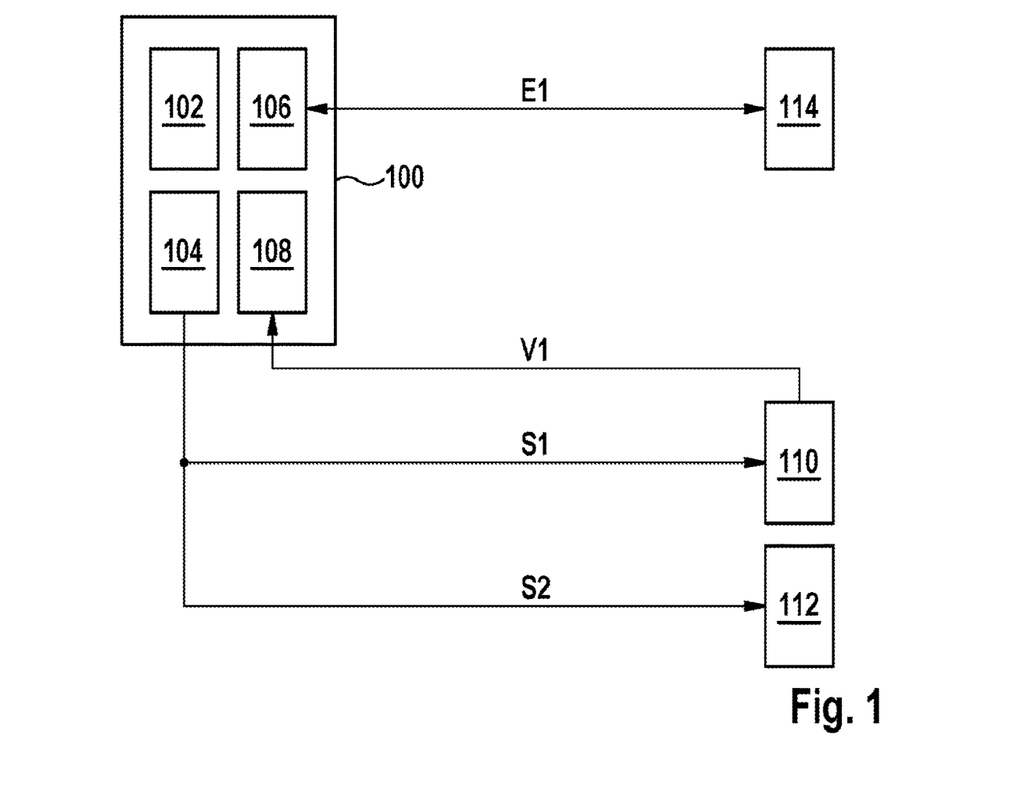
FIG. 1 a schematic illustration of an apparatus for operating a steering system, FIG. 2 a schematic illustration of aspects of the steering system, FIG. 3 aspects of a method for operating the steering system, FIG. 4 aspects of the method for determining request values.

In FIG. 1, an apparatus 100 for operating a steering system, in particular for a vehicle, is shown schematically.

The apparatus 100 comprises a computing device 102 and an actuating device 104.

The apparatus 100 also comprises an input device 106 and an interface 108.

The apparatus 100 can be a control unit, using which the steering system of the vehicle can be actuated.

The computing device 102 is designed to determine a setpoint S1 for an operating element actuator 110 of the steering system. The computing device 102 is designed to determine a setpoint S2 for a steering gear actuator 112 of the steering system. The computing device 102 is designed to determine the setpoint S1 for the operating element actuator 110 depending on an internal target value T1 for a behavior of an operating element, for example a steering wheel actuator or a force feedback joystick. The computing device 102 is designed to determine the setpoint S2 for the steering gear actuator 112 depending on a further internal target value T2 for a behavior of the steering gear actuator 112.

In the example, the input device 106 can be operated via a graphical user interface 114, e.g., a menu of a driver assistance system.

It can be provided that the target value T1 for the behavior of the operating element is determined depending on a specification V1 of a driver. The computing device 102 is also designed to determine the setpoint S1 for the operating element actuator 110 depending on a first request value O1 of a function, which is described below. The computing device 102 is also designed to determine the first request value O1 depending on a target value T3 of a function for influencing the operating element actuator 110.

It can be provided that the target value T2 for the behavior of the steering gear actuator 112 is determined depending on the specification V1. The computing device 102 is also designed to determine the setpoint S2 depending on a second request value O2 of the function, as described hereinafter. The computing device 102 is additionally designed to determine the second request value O2 depending on at least one target value T4 of a function for influencing a behavior of the steering gear actuator 112 of the vehicle.

The computing device 102 can be designed to determine the setpoint S1 and the setpoint S2 independently of one another. The computing device 102 can be designed to influence and/or specify the setpoint S1 and the setpoint S2 independently of one another by the respective request values.

The computing device 102 is designed to capture an input E1, in particular of a user, in particular via the user interface 114. The computing device 102 is designed to operate the steering system depending on the input E1 in any of the operating modes described below.

The actuating device 104 is designed to actuate the operating element actuator 110 depending on the setpoint S1 for the operating element actuator 110. The actuating device 104 is designed to actuate the steering gear actuator 112 depending on the setpoint S2 for the steering gear actuator 112.

Figure 2:
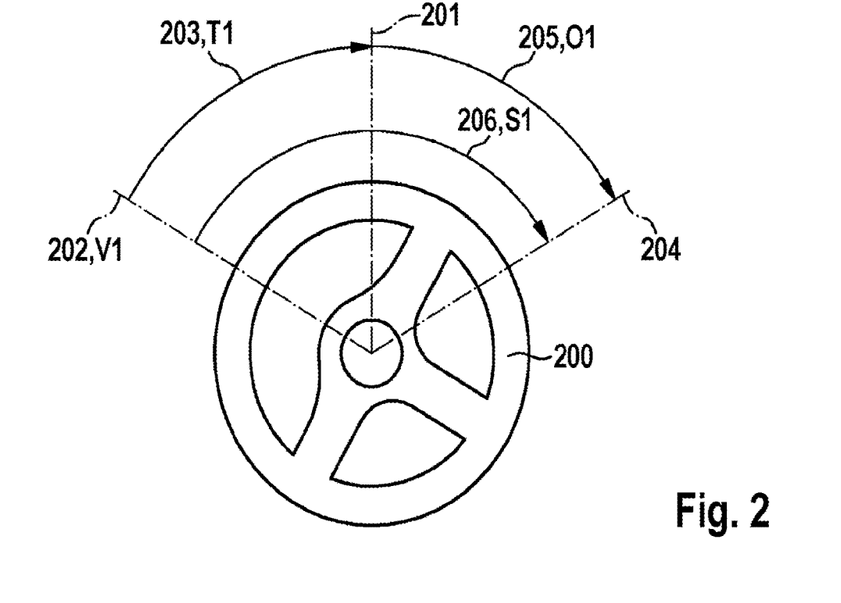

FIG. 2 shows a schematic illustration of aspects of the steering system. In FIG. 2, for the operating element, by way of an example, a steering wheel actuator with a steering wheel 200 and a home position at a position 201 for the operating element actuator 110 are shown.

In the example shown in FIG. 2, the steering wheel 200 is rotated into a position 202 by the specification V1 of the driver. The internal steering functionality calculates an internal target value 203 (T1), for example a torque target value, which returns the steering wheel to the position 201 in case of HandsOff or generates a resetting steering feeling in case of HandsOn. This corresponds to a basic steering wheel behavior or default feeling. In this context, HandsOff means, e.g., an operating mode enable the driver to remove their hands from the steering wheel 200. For example, in this context, HandsOn means an operating mode enabling the driver to specify the specification V1 by manually moving the steering wheel 200.

In this case, the setpoint S1 for the operating element actuator corresponds to the internal target value 203 (T1). For example, the internal target value 203 (T1) is a torque target value.

In the example shown in FIG. 2, an additional function, e.g. a driver assistance function, such as a lane assistant, can change the setpoint S1.

In the illustrated example, it can be provided that, in the case of HandsOff, the steering wheel is returned from V1 to a position 204. In the illustrated example, it can be provided that, in the case of HandsOn, a steering feeling that resets to the position 204 is generated. For example, the additional function outputs the request value O1, which results in a difference 205, e.g. a torque difference, between the positions 201 and 204. For example, the request value O1 is a torque difference.

In this example, the setpoint S1 for the operating element actuator 110 is a sum 206 of the internal target value 203 (T1) and the difference 205 caused by the request value O1.

The following functionalities can thus be implemented, e.g.:

In fully automated situations, particularly in situations where the steering wheel 200 is not moved by the driver, a comfortable steering wheel angle control can be performed.

In situations where the steering wheel 200 is moved by the driver, additional feedback can be output via the steering wheel 200 to the driver in order to harmoniously output a recommendation for a lane assistance function to the driver.

A vehicle manufacturer-specific, characteristic steering feeling can be obtained, particularly when the driver assistance function is engaged.

An additional feedback on the steering wheel 200 generated by an engagement of the driver assistant is implicitly adjusted to the vehicle manufacturer-specific, characteristic steering feeling (e.g., comfort mode, normal mode, or sports mode). As a result, the feedback on the steering wheel will be more pronounced in the sports mode than, e.g., in the comfort mode.

Figure 3:
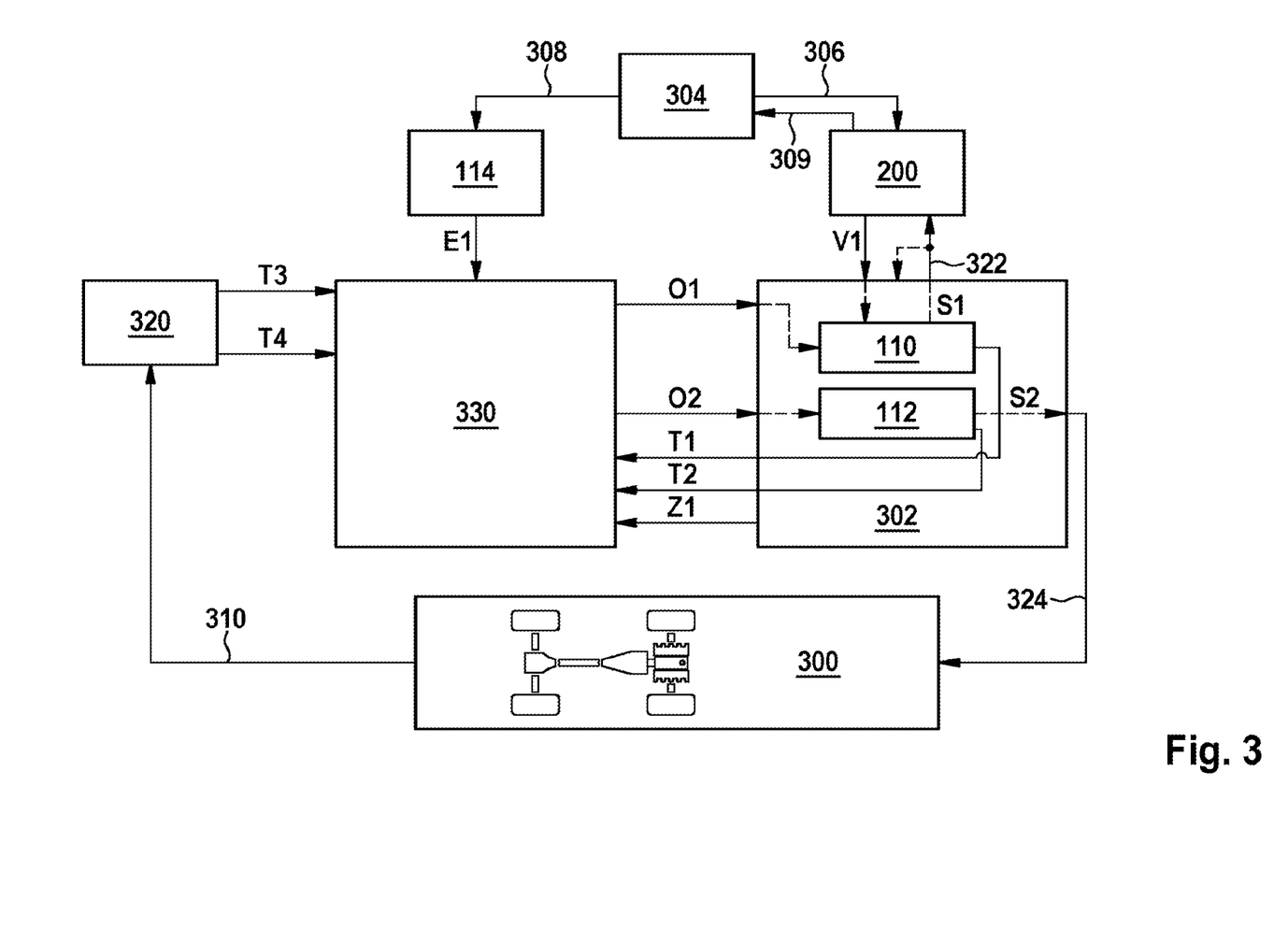

Referring now to FIG. 3, a method for operating the steering system will be explained. Using this method, the aforementioned functionalities as well as further functionalities of the driver-function interaction can, e.g., be achieved with the operating element actuator as well as the steering gear actuator.

In FIG. 3, the vehicle is shown schematically and bears reference character 300. The steering system comprising the operating element actuator 110 and the steering gear actuator 112 is shown schematically in FIG. 3 and bears reference character 302. In the example, a driver 304 can specify a steering wheel angle 306 for the operating element actuator 110 via the steering wheel 200 as a specification V1. The steering wheel 200 additionally has the task of transmitting haptic feedback 309 to the driver, which is characterized by the operating element actuator 110. In the example, the driver 304 can specify an operating state 308 via the graphical user interface 114. The graphical user interface 114 provides the input E1.

To implement the described functionalities, a function 330 is provided in the example that uses the target value T3 for influencing the operating element actuator 110 and the target value T4 for influencing the steering gear actuator 112 as input signals.

A variety of approaches are possible for calculating these target values T3 and T4. In the example, the target value T3 is determined by the function for influencing the operating element actuator 110. In the example, the target value T4 is determined by the function for influencing the behavior of the steering gear actuator 112. The function for influencing the operating element actuator 110 and the function for influencing the steering gear actuator 112 are shown in FIG. 3 as a function 320.

For example, function 320 can be a yaw rate controller for a lane assistant that plans a trajectory based on environmental sensors, converts it into one or more set yaw rates, and, by adjusting the target values T3 and T4, influences a lateral guidance of the vehicle with a steer-by-wire steering system such that a difference between a set yaw rate and an actual yaw rate is minimized or such that differences between a plurality of associated set yaw rates and actual yaw rates are minimized.

The operating element actuator 110 is designed to output a control variable 322 for the steering wheel 200. The control variable 322 can be used to provide haptic feedback to the driver 304, e.g. by rotating or also vibrating the steering wheel 200.

The steering wheel 200 is designed to output an actual value for the angle set by the driver 304 as specification V1, as described in FIG. 2. The steering wheel 200 is designed to transmit the haptic feedback 309 resulting from the setpoint S1 to the driver.

For example, the steering wheel 200 and the operating element actuator 110 are designed to adjust the setpoint S1 using the control variable 322.

With the target value T3, the function 320 can, for example, pursue the goal of returning the steering wheel from V1 to the position 204 in case of HandsOff or generating a steering feeling (haptic feedback) that resets to the position 204 in case of HandsOn. The function 330 transmits a corresponding request value O1 for this purpose.

The steering wheel 200 and operating element actuator 110 can also be designed to generate the haptic feedback to the driver 304, e.g. as a vibration, without changing the default steering feeling.

In the example, the steering gear actuator 112 is designed to output a control variable 324 for deflection of at least one steerable wheel. In the case of a vehicle that, instead of or in addition to a steerable wheel, is steerable with chains, it can be provided that a corresponding control variable is output for driving at least one wheel that moves the chain.

The control variable 322 changes a state of the steering wheel 200, and the control variable 324 changes the vehicle state 310.

In the example, the setpoint S1 for the operating element actuator 110 in the steering system 302 is determined depending on the target value T1 for the behavior of the steering wheel 200. It can also be provided that the input variable T1 is determined depending on the specification V1. In the example, the setpoint S1 for the operating element actuator 110 is additionally determined depending on the first request value O1.

In the example, the first request value O1 is determined depending on the target value T3 for influencing the operating element actuator 110. In this example, the function 320 comprises the influencing of the operating element actuator 110. In the example of a lane assistance function, it can be provided that the function 320 is the yaw rate controller.

In the example, the operating element actuator 110 is actuated with the control variable 322 depending on the setpoint S1. The control variable 322 in the example is a torque for the steering wheel 200. In the example, the control variable 324 is a torque for a steerable wheel or for a plurality of steerable wheels of the vehicle.

In the example, the setpoint S2 for the steering gear actuator 112 in the steering system 302 is determined depending on the target value T2 for the behavior of the steering gear actuator. It can be provided that this target value T2 for the behavior of the steering gear actuator is determined depending on the specification V1 of the operating element. In the example, the setpoint S2 for the steering gear actuator 112 is also determined depending on the second request value O2.

The second request value O2 is determined depending on the target value T4 for influencing the behavior of the steering gear actuator 112. In this example, the function 320 comprises the function for influencing the behavior of the steering gear actuator 112 of the vehicle. In the example of the lane assistance function, it can be provided that the function 320 is the yaw rate controller.

In the example, the steering gear actuator 112 is actuated with the control variable 324, depending on the setpoint S2.

In the example, the steering system 302 outputs a state of the steering system. This is designated as Z1 in FIG. 3. In the example, the state Z1 comprises the control variable 322, the control variable 324, and the specification V1. The state Z1 can comprise further system states as well as further signals. In the example, the steering system 302 outputs the target value T1 for the behavior of the operating element 110 and the target value T2 for the behavior of the steering gear actuator 112.

A logic 330 is provided for calculating the first request value O1 and the second request value O2. The logic 330 determines the first request value O1 and the second request value O2 depending on the state Z1, the target value T3 for the operating element actuator 110, the target value T4 for influencing the behavior of the steering gear actuator 112, the target value T1 for the behavior of the operating element 110, the target value T2 for the behavior of the steering gear actuator 112, and the desired operating mode E1.

A method for operating the vehicle is described hereinafter.

The method provides that the setpoint S1 for the operating element actuator 110 of the steering system 302 is determined, and the operating element actuator 110 is actuated depending on the setpoint S1 for the operating element actuator 110.

The method provides that the setpoint S2 for the steering gear actuator 112 of the steering system 302 is determined, and the steering gear actuator 112 is actuated depending on the setpoint S2 for the steering gear actuator 112.

The setpoint S1 for the operating element actuator 110 is determined depending on the target value T1, which results from the specification V1, among other things, and depending on the first request value O1.

The setpoint S2 for the steering gear actuator 112 is determined depending on the target value T2 for the behavior of the steering gear actuator, which results from the specification V1, among other things, and depending on the second request value O2.

Figure 4:
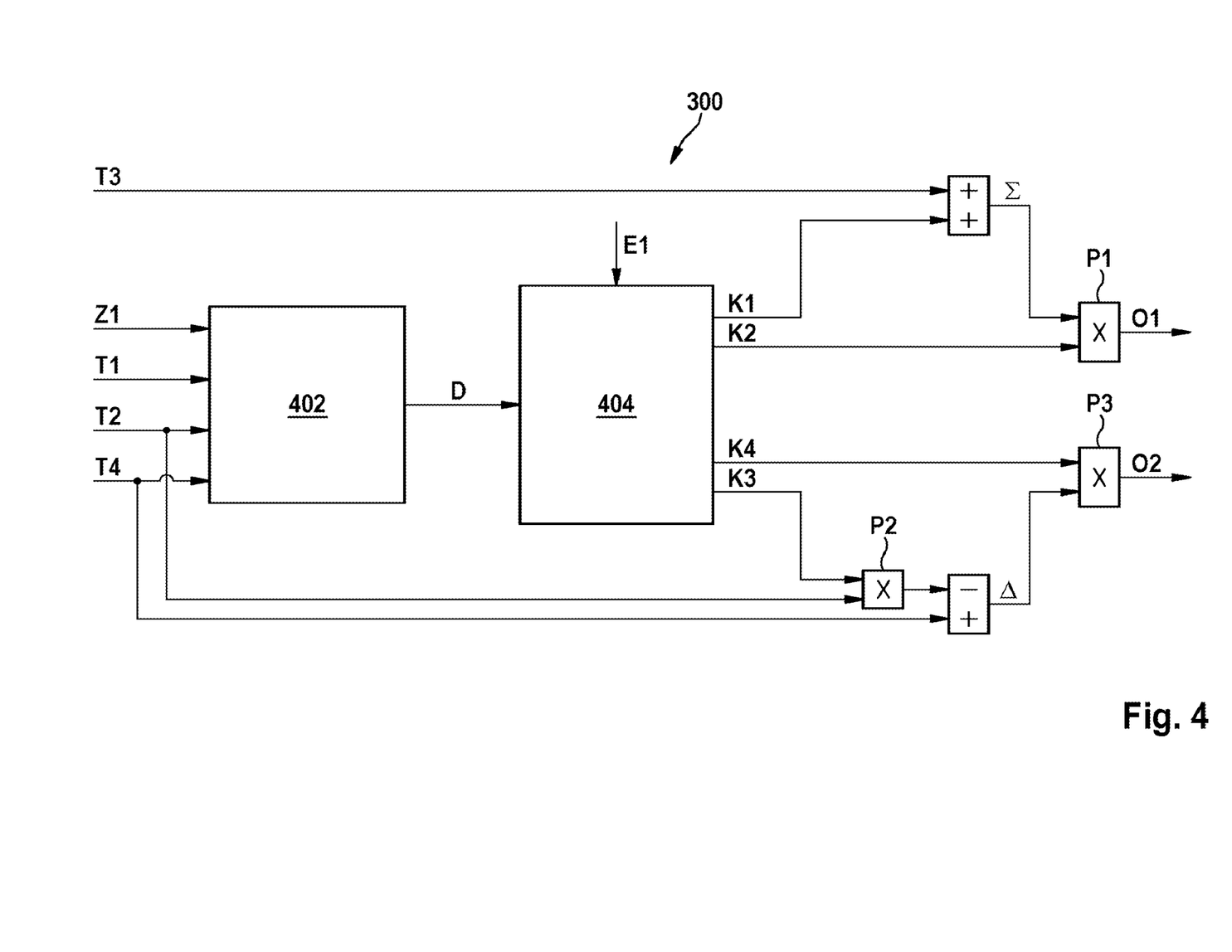

In FIG. 4, aspects of the calculation of the first request value O1 and the second request value O2 in the method are shown, in particular aspects of the logic 330.

In the example, in a step 402, a deviation D between the target value T4 for influencing the behavior of the steering gear actuator 112 and the target value T2 for the behavior of the steering gear actuator 112 is determined. In the example, this target value T4 is provided by the function 320. In the example, the deviation D is a normalized difference of these target values and, in the example, has values between 0 and 1. The deviation D can also be determined depending on the state Z1.

In a step 404, at least one component for determining the first request value O1 and/or the second request value O2 is determined depending on the deviation D.

Then, the first request value O1 and the second request value O2 are determined depending on at least one of these components.

In the example, depending on the function 320, the target value T3 is determined for the operating element actuator 110 and the first request value O1 is determined depending on a sum Σ of the target value T3 for the operating element actuator 110 with a first component K1 that is independent of the deviation D. In the example, the first component K1 is an internal steering wheel angle request value. This can be applied in order to account for a specific steering wheel behavior. As a result, in certain situations, such as when the driver suddenly lets go of the steering wheel 200 in case of a large steering turn, a slow return of the steering wheel 200 can be parameterized. The first component K1 can also be zero.

In the example, the second request value O1 is determined depending on a product P1 of the sum 2 with a second component K2 that changes depending on the deviation D. In the example, the component K2 is a function of the deviation D. The function can be parametrized with regard to a steering wheel behavior or steering feeling according to the desired application. For example, the function can result in decreasing values of the component K2 as the deviation D increases. Because this change acts at the steering wheel level, i.e. it influences a steering wheel behavior or a steering feeling, and does not ensure a driver's access to the steerable wheels, the steering wheel behavior or steering feeling is parameterized by a variety of different functions.

In the example, the sum 2 is a raw value for a steering wheel angle request value. In the example, the second component K2 is a factor with which the raw value is weighted. In the example, the second component K2 decreases with an increasing deviation D. In the example, the second component K2 has a range of values from 1 to 0. In other words, if the deviation is zero, then the second component K2=1. As a result, the target value T3 for the operating element actuator 110 is corrected only by the steering wheel angle request value.

For example, the second component K2 is determined depending on an applicable characteristic curve that maps the deviation D onto a value for the second component K2. This defines a behavior of the steering wheel 200 in the direction of the angle specified by the function.

Figure 5:
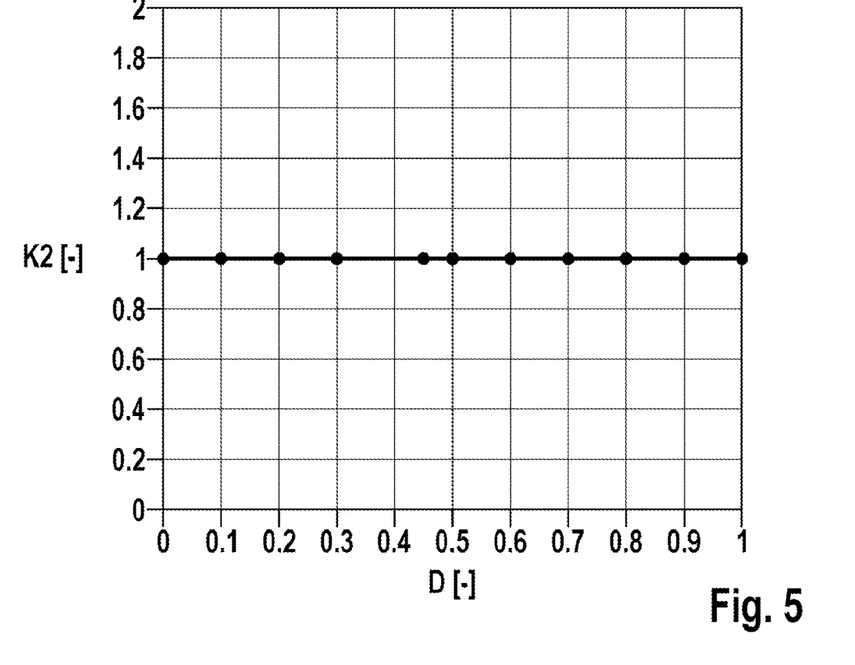
FIG. 5 depicts an exemplary parameterization for a component.

FIG. 5 depicts an exemplary parameterization for the second component K2.

In the example, the second request value O2 is determined depending on a product P2 of the target value T2 for the behavior of the steering gear actuator with a third component K3 that changes depending on the deviation D. In the example, the third component K3 is a function of the deviation D. The third component K3 can be parameterized so as to decrease as the deviation D increases. In the example, the third component K3 is a compensation value for the target value T2 for the behavior of the steering gear actuator. In the example, the third component K3 decreases with an increasing deviation D. This means that if there is a large deviation D, the driver's specification V1 is taken into account more strongly.

In the example, the second request value O2 is determined depending on a difference Δ between this product P2 and the target value T4 for influencing the behavior of the steering gear actuator 112.

In the example, the second request value O2 is determined depending on a product P3 of the difference Δ with a fourth component K4 that changes depending on the deviation D. In the example, the fourth component K4 is a factor with which the difference between the target value T4 for influencing the behavior of the steering gear actuator 112 and the target value T2 for the behavior of the steering gear actuator is considered. In the example, the fourth component K4 decreases with an increasing deviation D.

For example, the fourth component K4 is determined depending on an applicable characteristic curve that maps the deviation D onto a value for the fourth component K4. As a result, the manner is applied in which the driver will regain control if their intent deviates from that of the function. As a result, for example, an extent of the deviation D is applied as of which the driver regains access to the steered wheels. As a result, for example, a speed at which control is regained is parametrized.

Figure 6:
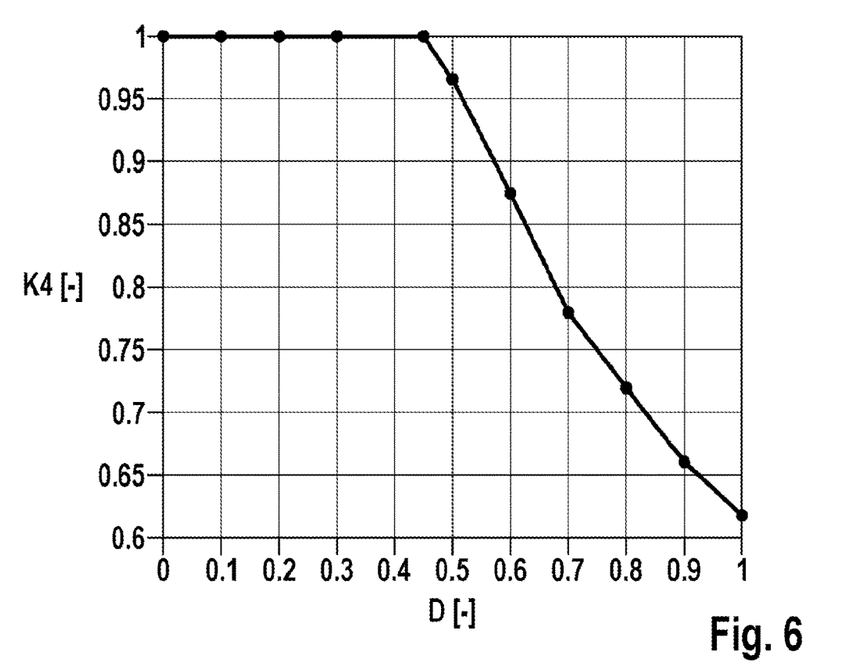
FIG. 6 depicts an exemplary parameterization for a further component.

FIG. 6 depicts an exemplary parameterization for the fourth component K4.

In the step 404, it can be provided that the input E1 is captured.

Depending on the input E1, it can be provided that, in a first operating mode, the operating element actuator 110 is actuated depending on the first request value O1 and the steering gear actuator 112 is actuated independently of the second request value O2. For example, the second component K2 is determined as being different from zero. As a result, the first request value O1 is not equal to zero. This means that the actuation of the operating element actuator 110 depends on the first request value O1. For example, the fourth components K4 are determined as zero. As a result, the second request value O2 is zero. This means that the actuation of the steering gear actuator is independent of the second request value O2.

It can be provided that the lane assistance function outputs haptic feedback in this operating mode in the form of a vibration on the steering wheel. In the example, this vibration does not change the angle set by the driver on the steering wheel 200.

The first operating mode is in particular parameterized by the selection of the components such that a driver specification through the steering wheel directly or synchronously acts on the set angle on the steerable wheels of the vehicle and the function, for example for a lane assistance in this operating mode, exclusively influences the steering wheel behavior in order to thereby influence the vehicle behavior.

For example, the second component K2 is determined such that the second component K2 is different from zero. For example, the fourth component K4 is determined such that the fourth component K4 is permanently set at zero.

Depending on the input E1, it can be provided that, in a second operating mode, the operating element actuator 110 is actuated at least temporarily depending of the first request value O1 and the steering gear actuator 112 is actuated at least temporarily depending on the second request value O2. For example, the second component K2 is determined such that the second component K2 is at least temporarily different from zero. For example, the fourth component K4 is determined such that the fourth component K4 is at least temporarily different from zero.

In the example, the second operating mode is a comfort mode. In the second operating mode, for example, the lane assistance function can provide a threshold value that defines a range within which the function can change the angle of the vehicle set on the steerable wheels independently of the driver without providing feedback to the driver via the steering wheel. That is to say, the driver is decoupled from the steerable wheels in this range set by the threshold. This parameter is applicable in the example. As a result, the components are parameterized such that the driver slowly regains their coupling to the angles set on the steerable wheels when the function is ended. Wheel steering angle corrections caused by lateral wind or inclined roadways, for example, are thus conveniently performed without feedback to the driver on the steering wheel.

Depending on the input E1, it can be provided that, in a third operating mode, the operating element actuator 110 is actuated with a constant request value O1 for the operating element actuator 110 and the steering gear actuator 112 is actuated at least temporarily depending on the second request value O2. For this purpose, it can be provided that the first component K1 and the second component K2 are determined such that the first request value O1 remains constant. As a result, the steering wheel angle on the steering wheel 200 remains statically in the desired position of, for example, 0°. If the driver takes over the vehicle lateral guidance again, i.e. the driver provides an input that is different from the desired steering wheel position, the function's access to the steerable wheels in this operating mode is gradually faded out so that the driver gradually regains the vehicle lateral guidance back via the angle set on the steerable wheels.

This is particularly useful for at least temporary autonomous driving, e.g., in SAE level 3 or level 4.

Other operating modes can also be provided.

In the example, the steps 402 and 404 are repeatedly performed during operation of the vehicle.

The steering system can be a steer-by-wire system having two separate interfaces: an interface for the operating element actuator 110 and an interface for the steering gear actuator 112. With these interfaces, the function can be particularly well realized, especially by contrast to an interface for a request value for a torsion of a torsion bar or for a request value for a torque of a drive for the steering gear or for a request value for a gear position of the steering gear.

Figure 7:
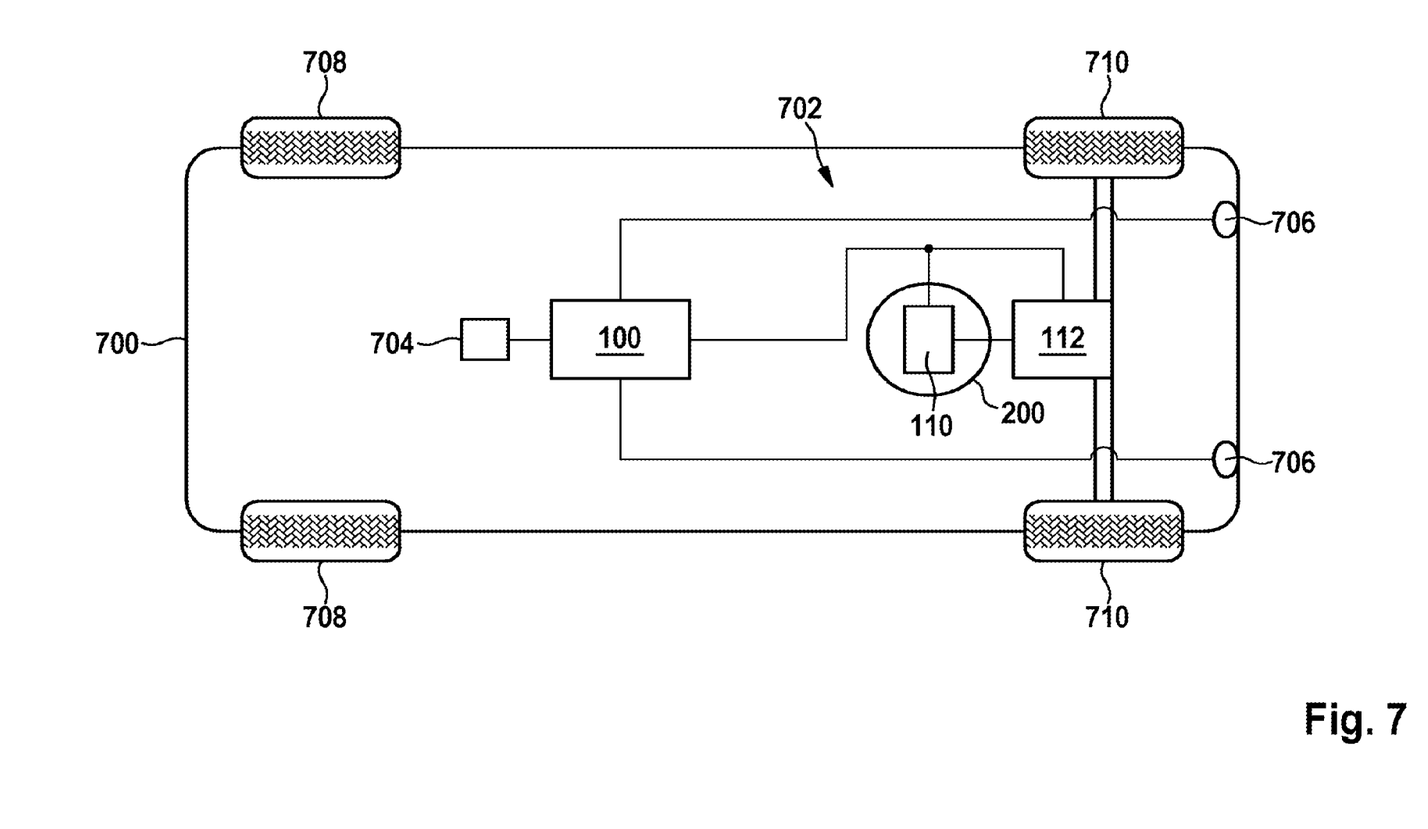
FIG. 7 depicts a schematic illustration of a vehicle comprising the apparatus.

FIG. 7 shows a schematic illustration of a vehicle 700 comprising the apparatus 100.

The vehicle 700 comprises a steering system 702. The steering system 702 comprises the operating element actuator 110 and the steering gear actuator 112. In the example, the operating element actuator 110 and the steering gear actuator 112 are connected to the apparatus 100 via data lines shown as a solid line.

In the example, the vehicle 700 comprises a yaw rate sensor 704 designed to capture the current yaw rate of the vehicle 700. At least one further sensor can also be provided, with which the current yaw rate of the vehicle 700 can be computed from a model.

The vehicle 700 comprises at least one sensor 706 designed to capture information about an environment of the vehicle 700. The at least one sensor 706 can comprise the camera, a radar sensor for the radar system, or the LiDAR system. The processing of the sensor data, e.g. from captured images, can be performed in the apparatus 100 or, e.g., in the radar system or LiDAR system.

In the example, these sensors are connected to the apparatus 100 via data lines shown as a solid line. For example, the apparatus 100 can comprise the yaw rate controller for the lane assistant, which determines the target values T3 and T4 using data from the yaw rate sensor 704 and the at least one sensor 706 as the environmental sensor.

In the example, the vehicle 700 comprises two rear wheels 708 and two front wheels 710. In the example, the rear wheels 708 are not steerable. In the example, the front wheels 710 are steerable by the apparatus 100 via the steering system 702, as described.

In addition to the front wheels 710, or instead of the front wheels 710, the rear wheels 708 can be steerable by the apparatus 100 via the steering system 702.

The data lines can be designed as part of a controller area network (CAN), bus system, or another form of data transmission.

The invention claimed is:

1. A method for influencing and/or operating a steering system comprising:
    determining a setpoint for an operating element actuator of the steering system independently of a setpoint for a steering gear actuator;
    actuating the operating element actuator depending on the determined setpoint for the operating element actuator;
    determining the setpoint for the steering gear actuator of the steering system independently of the determined setpoint for the operating element actuator; and
    actuating the steering gear actuator depending on the determined setpoint for the steering gear actuator,
    wherein the setpoint for the operating element actuator is determined depending on a target value for a behavior of an operating element and depending on a first request value,
    wherein the setpoint for the steering gear actuator is determined depending on a target value for a behavior of the steering gear actuator and depending on a second request value,
    wherein the first request value is determined depending on a target value of a function for influencing the operating element actuator, and
    wherein the second request value is determined depending on a target value of a function for influencing a behavior of the steering gear actuator of the vehicle.

2. The method according to claim 1, wherein the determined setpoint for the operating element actuator and the determined setpoint for the steering gear actuator are influenced and/or specified independently of one another by the first and second request values.

3. The method according to claim 1, further comprising:
determining a deviation between the target value for the behavior of the steering gear actuator and the target value of the function for influencing the behavior of the steering gear actuator,
wherein the first request value and/or the second request value is determined depending on the determined deviation.

4. The method according to claim 3, wherein the first request value is determined depending on a sum of the target value of the function for influencing the operating element actuator with a first component that is independent from the determined deviation and/or depending on a product of the sum or the target value for the operating element actuator with a second component that changes depending on the determined deviation.

5. The method according to claim 4, wherein the second component is a function of the determined deviation.

6. The method according to claim 3, wherein the second request value is determined depending on a product of the second target value for the steering gear actuator with a third component that changes depending on the determined deviation and/or depending on a difference between the product and the target value for the steering gear actuator.

7. The method according to claim 6, wherein the third component is a function of the determined deviation.

8. The method according to claim 6, wherein the second request value is determined depending on a product of the difference with a fourth component that changes depending on the determined deviation.

9. The method according to claim 8, wherein the fourth component decreases when the determined deviation increases.

10. The method according to claim 1, further comprising:
capturing an input of a user,
wherein, depending on the captured input, in a first operating mode, the operating element actuator is actuated depending on the first request value and the steering gear actuator independently of the second request value or, in a second operating mode, the operating element actuator is actuated at least temporarily depending on the first request value and the steering gear actuator is actuated at least temporarily depending on the second request value, or, in a third operating mode, the operating element actuator is actuated with a constant first request value and the steering gear actuator at least temporarily depending on the second request value.

11. The method according to claim 1, wherein an apparatus is configured.

12. A steering system comprising:
an apparatus for influencing and/or operating the steering system, the apparatus configured to:
determine a setpoint for an operating element actuator of the steering system independently of a setpoint for a steering gear actuator;
actuate the operating element actuator depending on the determined setpoint for the operating element actuator;
determine the setpoint for the steering gear actuator of the steering system independently of the determined setpoint for the operating element actuator; and
actuate the steering gear actuator depending on the determined setpoint for the steering gear actuator,
wherein the setpoint for the operating element actuator is determined depending on a target value for a behavior of an operating element and depending on a first request value,
wherein the setpoint for the steering gear actuator is determined depending on a target value for a behavior of the steering gear actuator and depending on a second request value,
wherein the first request value is determined depending on a target value of a function for influencing the operating element actuator, and
wherein the second request value is determined depending on a target value of a function for influencing a behavior of the steering gear actuator of the vehicle.

13. The method according to claim 1, wherein a computer program comprises computer-readable instructions that, when executed by a computer, cause the method to be performed.

* * * * *